United States Patent
Lani et al.

(10) Patent No.: US 11,720,062 B2
(45) Date of Patent: Aug. 8, 2023

(54) BALANCE OF A TIMEPIECE

(71) Applicant: CSEM Centre Suisse d'Electronique et de Microtechnique SA-Recherche et Developpement, Neuchatel (CH)

(72) Inventors: Sebastien Lani, Courtaman (CH); Frederic Maier, Neuchatel (CH); Emmanuel Dupas, Chapelle (CH); Thierry Conus, Lengnau (CH)

(73) Assignee: CSEM Centre Suisse d'Electronique et de Microtechnique SA-Recherche et Developpement, Neuchatel (CH)

( * ) Notice: Subject to any disclaimer, the term of this patent is extended or adjusted under 35 U.S.C. 154(b) by 950 days.

(21) Appl. No.: 16/671,313

(22) Filed: Nov. 1, 2019

(65) Prior Publication Data
US 2020/0142359 A1  May 7, 2020

(30) Foreign Application Priority Data
Nov. 5, 2018  (EP) ..................................... 18204358

(51) Int. Cl.
*G04B 17/00* (2006.01)
*G01M 1/32* (2006.01)
(Continued)

(52) U.S. Cl.
CPC .............. *G04B 17/00* (2013.01); *G01M 1/32* (2013.01); *G04B 17/063* (2013.01); *G04B 17/20* (2013.01);
(Continued)

(58) Field of Classification Search
CPC ...... G04B 17/00; G04B 18/006; G04B 18/04; G04B 17/063; G01M 1/32; G04D 7/088; G04D 7/1257
See application file for complete search history.

(56) References Cited

U.S. PATENT DOCUMENTS

| 2010/0054090 A1* | 3/2010 | Orny | G04B 18/006 368/175 |
| 2012/0087214 A1* | 4/2012 | Damasko | G04B 17/063 368/169 |
| 2015/0185700 A1* | 7/2015 | Kawauchiya | G04B 17/063 368/127 |

FOREIGN PATENT DOCUMENTS

| CH | 705 928 A2 | 6/2013 |
| CN | 1652046 A | 8/2005 |

(Continued)

OTHER PUBLICATIONS

Combined Chinese Office Action and Search Report dated Jan. 6, 2021 in Chinese Patent Application No. 201911074961.6 (with English abstract), 9 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A balance of a timepiece including an adjustment face provided with at least one recess provided for receiving a projected material for an implementation of an adjustment of the rate of the timepiece notably by the modification of the inertia and of the unbalance of the balance, the recess including an opening and a back notably a solid back or a back fully or partially forming an orifice, the back being at most partially visible from a position defined above the opening notably on a central axis of the opening.

15 Claims, 2 Drawing Sheets

(51) Int. Cl.
    *G04B 18/00*     (2006.01)
    *G04D 7/08*     (2006.01)
    *G04D 7/12*     (2006.01)
    *G04B 17/20*     (2006.01)
    *G04B 17/28*     (2006.01)
    *G04B 17/06*     (2006.01)
    *G04B 18/04*     (2006.01)

(52) U.S. Cl.
    CPC ........... *G04B 17/28* (2013.01); *G04B 18/006* (2013.01); *G04B 18/04* (2013.01); *G04D 7/088* (2013.01); *G04D 7/1257* (2013.01)

(56) References Cited

FOREIGN PATENT DOCUMENTS

| CN | 101675392 A | 3/2010 | |
|---|---|---|---|
| CN | 101378327 A | 2/2011 | |
| WO | WO 2018/015071 A1 | 1/2018 | |
| WO | WO-2018015071 A1 * | 1/2018 | ............. G04D 7/085 |

OTHER PUBLICATIONS

European Search Report dated Jun. 12, 2019 in European Application 18204358.8 filed on Nov. 5, 2018 (with English Translation of Categories of Cited Documents).

* cited by examiner

BALANCE OF A TIMEPIECE

CROSS-REFERENCE TO RELATED APPLICATION

This application claims priority to European Patent Application No. 18204358.8 filed on Nov. 5, 2018, the entire disclosure of which is hereby incorporated herein by reference.

TECHNICAL FIELD AND PRIOR ART

The invention relates to a balance of a timepiece as well as a method for adjusting the rate of the timepiece.

BACKGROUND OF THE INVENTION

In a timepiece, a resonator classically includes a spring balance. Said spring balance is the true heart of the mechanical movements in timepieces since it regulates the rate of the time thanks to the oscillations thereof and is responsible for the precision of such parts. The oscillation period of a spring balance depends in particular on the inertia of the balance and the stiffness of the balance-spring. Said period is affected by numerous secondary phenomena, notably by the stiffness variation of the balance-spring according to the temperature, by the variations in friction of the air on the balance, by the existence of an unbalance on the balance or even by the gaps existing at the pivots of the shaft of the spring balance. A deviation in the order of a few seconds per day is generally permitted for a timepiece equipped with a mechanical movement, however all of the aforementioned secondary phenomena must be scrupulously controlled during the manufacture of the resonator or even casing of the horological movement.

Traditionally, the inertia and the unbalance of the balance are adjusted, by removing the material by machining during a plurality of successive measuring and machining steps in order to tighten the isochronism curves of the resonator to the maximum. Nevertheless, it was noted that the rate changes substantially at the time of the casing of the movement caused by the stresses generated on the movement by the casing or even due to aerodynamic changes induced by a sealed environment of the case. Therefore, it is necessary to perform a final adjustment to precisely adjust the rate of the movement after casing of said movement. Said final adjustment may be carried out in various ways, in particular by an adjustment of the position of the inertia-blocks arranged on the balance, by an adjustment of the active length of the balance-spring by means of an index-assembly system, by the ablation of material from the balance by means of a laser source or even by the addition of material by projection on the balance.

However, said various ways of carrying out said final adjustment have a plurality of disadvantages.

For example, the adjustment of the position of the inertia-blocks or of the active length of the balance-spring is a delicate operation for an operator and difficult to automate. Moreover, the index-assembly system is likely to go wrong over time, notably in the event of impact. The ablation of material by laser degrades the aesthetic appearance of the balance and may cause deposits of carbonised material in the movement. Lastly, the addition of material by projection of the material in liquid form according to an automated method produced notably by a printer of the Aerosol Jet type may cause splashes, resulting from the impact of the material on the balance, which may spread and contaminate the horological movement.

SUMMARY OF THE INVENTION

Consequently, one aim of the invention is to propose a balance of a resonator of the spring balance type suitable for a precise adjustment of the rate of the movement by projection of material and optimised for mitigating notably the problem of splashes that may spread in the movement.

Another aim of the invention is to propose a method for adjusting a timepiece comprising a resonator equipped with a balance according to the invention.

In said intention, the invention relates to a balance of a timepiece including an adjustment face provided with at least one recess provided for receiving a projected material for an implementation of an adjustment of the rate of said timepiece notably by the modification of the inertia and of the unbalance of the balance, said recess including an opening and a back notably a solid back or a back fully or partially forming an orifice, in said balance:
  said back being at most partially visible from a defined position above said opening notably on a central axis of the opening, or
  said back having a gap with said opening which is larger or substantially larger than the largest geometric dimension of said back.

In other embodiments:
  the opening is configured in the adjustment face relatively at the back of said recess rendering said back at most partially visible from said position;
  the opening includes an edge defining a surface that is smaller or substantially smaller than a surface of the back of the recess;
  the recess extends in a direction forming with the central axis of the opening an acute angle;
  the recess has a vertical cross-section of essentially flared, rectangular or even circular shape;
  the recess has a vertical cross-section of essentially rectangular, square, circular, or even trapezoidal shape;
  the recess includes an inner wall provided with a bulge extending substantially horizontally or fully or partially horizontally over a portion of a surface of said wall;
  balance includes a felloe, a hub intended to be mounted pivoting on a staff balance, and at least one arm connecting the felloe to the hub, the felloe of the balance comprising said a least one recess;
  balance includes a plurality of arms at least one of which includes said at least one recess;
  a plurality of recesses are distributed regularly or irregularly on the periphery of the felloe, and
  at least three recesses are regularly distributed on the periphery of the felloe, each recess extending in an arc of circle of an angle varying between 20° and 90°, preferably between 40° and 60°.

The invention also relates to a method for adjusting the rate of a timepiece including said balance, the method comprising the following steps:
  measurement of the rate of the timepiece;
  determination of a correction value to be applied to the inertia and/or to the unbalance of the balance in order to obtain a corrected rate of said timepiece, and
  application of a material in one or more recesses arranged on the balance in order to modify the inertia of the balance according to said correction value.

Advantageously, the application step includes a sub-step for projection of the material into one or more of these recesses.

In particular, the projection sub-step includes a phase for selective projection of the material into one or more of these recesses.

Advantageously again, during the projection sub-step one or more types of material are projected on the balance.

Furthermore, the method includes a step for arranging a horological movement including the balance in a middle part of a case of the timepiece.

The invention also relates to a timepiece comprising such a balance.

SUMMARY DESCRIPTION OF THE DRAWINGS

Other specific features and advantages will become clearly apparent from the following description made hereafter, by way of indicative and non-limiting example, with reference to the appended figures, wherein.

DETAILED DESCRIPTION OF PREFERRED EMBODIMENTS

Figure 9:
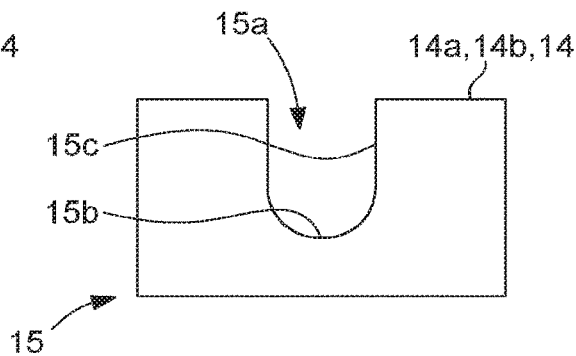
FIGS. 9 and 10 show the second variants of the recess each including a back having a gap with an opening of said recess that is larger or substantially larger than the largest geometric dimension of said back, according to the embodiment of the invention.
Figure 10:
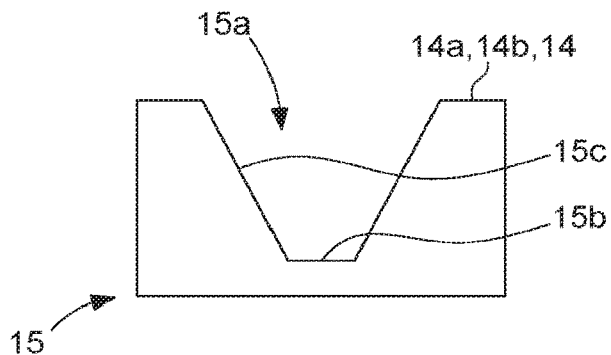
Figure 11:
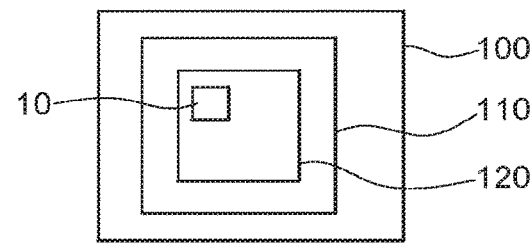
FIG. 11 shows a timepiece including such a balance, according to the embodiment of the invention.

With reference to FIGS. 1 to 10 and 13, the invention relates to a balance 10 of a resonator 120 of the spring balance type of a horological movement 110 of a timepiece 100 visible in FIG. 11. Such a balance 10 is provided with at least one recess 15 provided for receiving a projected material for an implementation of an adjustment of the rate of the timepiece 100 and therefore of the movement 110 thereof. Such a recess 15 of the balance 10 again known as groove or cavity, is suitable for receiving a projection of material during a method for adjusting the rate of said timepiece 100 subsequently described.

Figure 1:
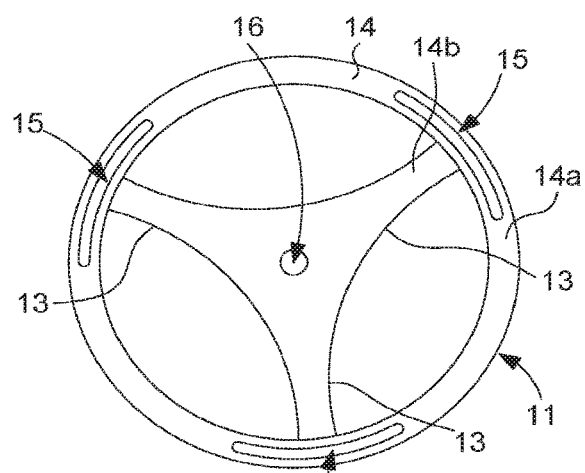
FIG. 1 is a top view of a balance comprising three recesses, according to one embodiment of the invention.
Figure 2:
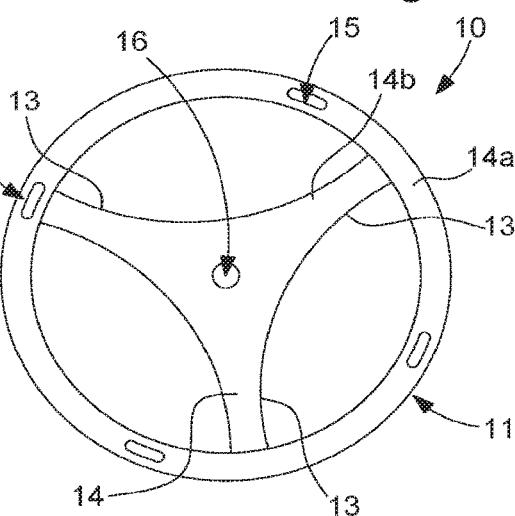
FIG. 2 is a top view of the balance comprising four recesses, according to the embodiment of the invention.
Figure 3:
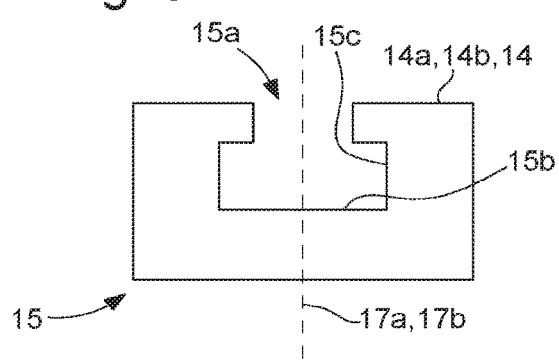
FIGS. 3 to 8 show the first variants of the recess each including a back that is at most partially visible from a defined position above an opening of said recess, according to the embodiment of the invention.
Figure 4:
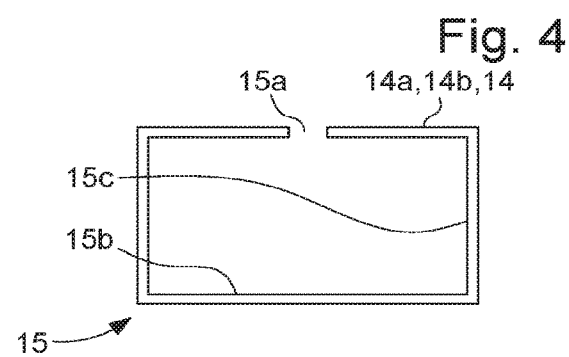
Figure 5:
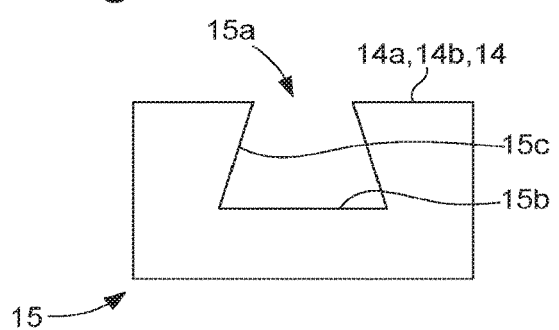
Figure 6:
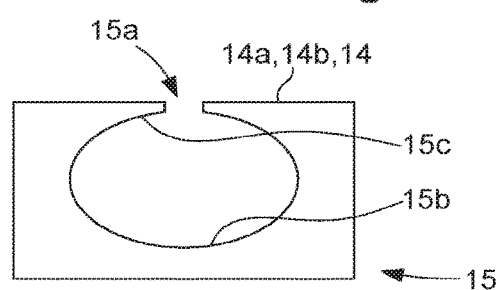
Figure 7:
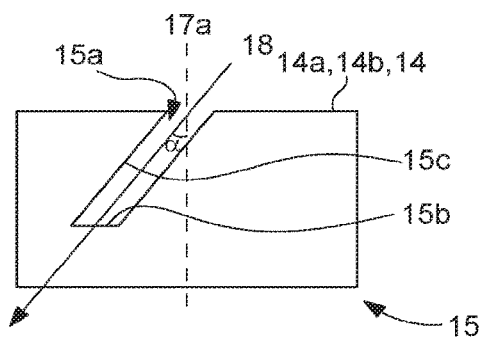
Figure 8:
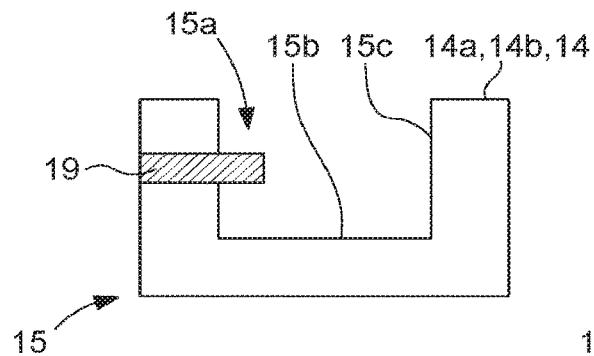
Figure 13:
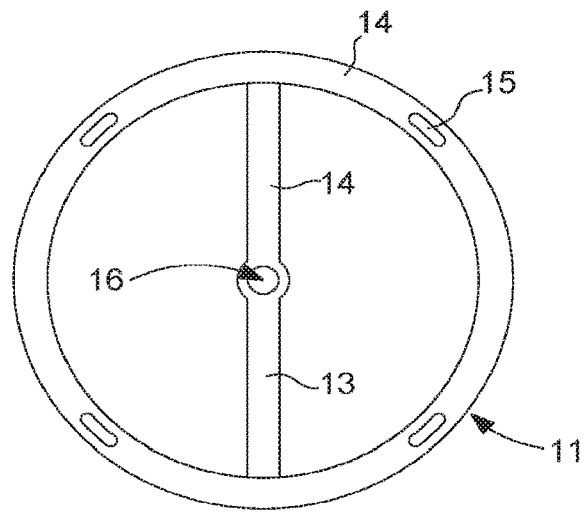
FIG. 13 is a top view of the balance comprising two arms and four recesses, according to the embodiment of the invention.

To this end in FIGS. 1, 2 and 13, the balance 10 comprises a felloe 11, a hub 12 intended to be mounted pivoting on a staff balance 16, and one or more arms 13, for example, two, three or four arms 13, connecting the felloe 11 to the hub 12. The balance 10 includes an adjustment face 14 that is flat or substantially flat, and extending in a plane orthogonal to the staff balance 16. Said adjustment face 14 is oriented towards the back of the case of the timepiece 100 when the balance 10 is included in a horological movement 110 that is mounted in said case. Said adjustment face 14 includes a first portion 14a included/defined in the felloe 11 of the balance 10 and a second portion 14b in the arms 13 of said balance 10.

As we have already mentioned, the balance 10 includes at least one recess 15. Such a recess 15 may be a groove, a cavity or even a concave structure, being provided with an opening 15a, a solid back 15b that may have a substantially flat surface as well as an inner wall 15c connecting said opening 15a to said back 15b. A solid back must be understood here as being a back free of opening/orifice. In one variant, said recess 15 may be crossing forming a through hole then including an opening and a back fully or partially forming/including an orifice/an opening. The recess 15 may be defined in the felloe 11 or one of the arms 13 of the balance 10. When the balance 10 comprises a plurality of recesses 15, same may be distributed only in the arms 13 of said balance 10 or only in the felloe 11 or then in the arms 13 and the felloe 11 of said balance 10. Alternatively, when the balance 10 includes a recess 15, same may be defined in the adjustment face 14 around the entire contour of the felloe 11. Said last configuration makes it possible notably to provide an adjustment of the rate of the movement by a more effective correction of the unbalance of the balance due to the fact that in said context the movement is already in vertical position for the rate measurements therefore fewer manipulations. In addition, the effect of the correction made is accentuated in comparison with a balance the recess or recesses of which are defined in other portions of the adjustment face 14 of the felloe 11, because in said alternative the deposit of material is carried out further away from the axis of rotation of the balance with in addition less material added for a same correction or a more significant correction obtained for the same quantity of material added.

Such a recess 15 may be produced in the balance 10 from milling and/or deep laser engraving operations. Said recess 15 may also be produced during a three-dimensional manufacturing operation of the balance 10 (for example, by DRIE etching or printing, or even laser insolation and wet etching) or even of the felloe or of the arms constituting same or even from an operation for assembling two layers of parts one of which comprises a through hole. Said assembly operation may implement a technique of the "wafer bonding" type or even double-sided deep reactive ionic etching, ultrasonic bonding or pin punching or even screwing methods, etc.

In examples illustrated in FIGS. 1 and 2 where recesses 15 are only defined in the portion 14a of the adjustment face 14 of the balance 10, that is to say only in the felloe 11, said latter then comprises a plurality of openings 15a giving access to an internal volume of the corresponding recesses 15. In said configuration, each recess 15 and therefore each corresponding internal volume, is intended to receive a projection of material in order to modify the inertia of the balance 10. In a non-limiting way, said projected material may be in the liquid, paste-like or solid state and may include a glue, a paint or a metal suspension. Such a material is in the present embodiment preferably a material in liquid state/form. In addition, it will be noted that said material may be hardenable when it is exposed, for example, to a cold source or even to a hot source likely to interact with a ventilation device. Alternatively, when said projected material is in the solid state including, for example, an ink comprising silver, tungsten or even tungsten carbide in the form of flakes or pieces, it does not require any specific subsequent treatment after the projection thereof on the balance 10.

In FIG. 1, the felloe 11 comprises a plurality of recesses 15, for example, three recesses 15, distributed on the periphery of the felloe 11 defined in the portion 14*a* of the adjustment face 14. Each recess 15 extends in an arc of circle of an angle, for example, between 5° and 120° and preferably between 30° and 60°. In FIG. 2, the felloe 11 comprises a multitude of recesses 15, for example, four recesses 15 or more, which are distributed on the periphery of said felloe 11. Said recesses 15 extend in an arc of circle of an angle less than 90° and preferably less than 5°.

In said two embodiments, the recesses 15 may, for example, be regularly distributed on said periphery of the felloe 11 of the balance 10 so as to obtain a symmetrical distribution of the projected material in all of the recesses or some of same in order to modify the inertia of the balance 10 without modifying the centre of mass thereof during the final adjustment thus contributing to precisely adjusting the rate of the movement 110. The recesses 15 according to the two aforementioned embodiments may, according to another example, be distributed on the periphery of the felloe 11 asymmetrically in order to modify the inertia of the balance 10 and the centre of mass thereof by projection of material into all of the asymmetrical recesses or some of same. In another example, the recesses 15 of the balance 10 are distributed symmetrically on the felloe 11 of the balance 10 and the material may be projected only into some of said recesses 15 that have an asymmetrical configuration in relation to one another.

Advantageously, the recess 15 has a specific shape so as to contain in the internal volume thereof possible splashes resulting from the impact of the projected material against the back 15*b* thereof and thus prevent the contamination of the horological movement 110 during a final adjustment necessary for precisely adjusting the rate of the movement once same has been arranged/driven in a middle part of the timepiece 100.

The recesses 15 in said balance 10 have a general concave shape and may be of two types depending on whether same belong to a first or a second alternative variant of recess 15. In the first variant of recess 15 visible in FIGS. 3 to 8, the back 15*b* of said latter is at most partially visible from a position defined above the opening 15*a* thereof. The position is here "a viewpoint" that is arranged above the adjustment face 14 of the balance 10 and preferentially on a central axis 17*a* of the opening 15*a* visible in FIG. 3. Said position is similar to same of an outlet orifice of a device provided for projecting the material into said recess 15. Therefore, it is understood that the embodiment of such a recess 15 may therefore envisage configuring the opening 15*a* relatively at the corresponding back 15*b* of the recess 15.

In a first sub-variant of said first variant of recess 15 illustrated in FIGS. 3 to 6, the opening 15*a* of said recess 15 may include an edge defining an access space including a surface that is smaller or substantially smaller than a surface of the back 15*b* of the recess 15. In said configuration, the central axes 17*a*, 17*b* of the back 15*b* and of the opening 15*a* and therefore of their respective surfaces, preferably coincide. Thus, a more or less large portion of the back 15*b* of the recess 15 is then hidden by the edge of the opening 15*a*. In a second sub-variant illustrated in FIG. 7, the recess 15 extends in a direction 18 forming with the central axis 17*a* of the opening 15*a* an acute angle α. In other words, the opening 15*a* of said recess 15 is arranged in an offset manner in relation to the back 15*b* so that said back 15*b* is at most partially visible from the position defined above said opening 15*a*. In said configuration, the central axes 17*a*, 17*b* of the back 15*b* and of the opening 15*a* and therefore of their respective surfaces, do not coincide. In a third sub-variant visible in FIG. 8, the recess 15 includes an inner wall 15*c* provided with a bulge 19 extending substantially horizontally or fully or partially horizontally over a portion of a surface of said wall 15*c*. Said bulge 19 may be formed integrally with the inner wall 15*c* or be an insert (for example, a screw) arranged in the internal volume of the recess 15. It is understood that said bulge 19 is defined to partially conceal/hide the back 15*b* of the recess 15 in order that said back 15*b* is at most partially visible from the position defined above said opening 15*a*.

In said first variant, the recess 15 has a cross-section of essentially rectangular, square, circular, or even trapezoidal shape. Said cross-section otherwise known as vertical cross-section is in a vertical transverse plane that is perpendicular to the adjustment face 14 of the balance 10.

In a second variant of recess 15 visible in FIGS. 9 and 10, the back 15*b* has a gap with said opening 15*a* that is larger or substantially larger than the largest geometric dimension of the back 15*b* thereof. This gap corresponds to the depth of the recess 15 and the largest geometric dimension may be here a length when said back 15*b* with an essentially rectangular shape or even a diameter if the shape of said back 15*b* is substantially circular. In said second variant, the recess 15 has a vertical cross-section of essentially flared, rectangular or even circular shape.

It will be noted that the shape of the cross-section of said two variants of the recess 15 notably participate in:
- confining the possible splashes subsequent to the projection of material;
- geometrically defining the position of the material deposit on the adjustment face 14;
- improving the aesthetics of the material deposit on the adjustment face 14;
- facilitating the adherence of the material deposit on the adjustment face 14, independently of the preparation of the adjustment face 14;
- protecting the material deposit against possible tweezer blows that may occur during manipulations of the horological movement 110.

In said context, the recess 15 leads to the adjustment face 14 of the balance 10, said face 14 being intended to be arranged opposite the back of the case of the timepiece 100 when the horological movement 110 is mounted in said case. According to said arrangement, it is consequently possible to make a final adjustment of the rate of the horological movement 110 when it is mounted in the middle part of the timepiece 100, before the assembly of the back of the case with the middle part, by adjusting the material projection device above the balance 10 whilst making sure that the oscillating weight of said timepiece 100 is released from the resonator of the movement 110 for a movement of the automatic type. The material projection device may, for example, be a printer of the Aerosol Jet type that permits a very precise projection with a very low volume of material.

Figure 12:
FIG. 12 shows a flow chart relating to a method for adjusting the rate of the timepiece, according to the embodiment of the invention.

With reference to FIG. 12, the invention also relates to a method for adjusting the rate of the horological movement 110. Said method includes a step for arranging 20 the horological movement 110 including the balance 10 in the middle part of the case of the timepiece 100. Subsequently, the method provides a step for measuring 21 the rate of said horological movement 110 thus deposited in the middle part. Said measurement may be produced preferably without contact given that the access to the resonator is particularly narrow. In a known manner, the measurement of the rate of the movement may thus be produced, for example, in optical or acoustic form. Said measuring step 21 makes it possible to compare the rate measured with a desired rate. Moreover, it also makes it possible to know the beat of the balance 10 in order to be able to synchronise same with the material projection in order to precisely deposit the material in the recess 15 or in each recess 15 of the balance 10.

The method subsequently includes a step for determining 22 the correction value to be applied to the inertia of the balance 10 in order to obtain a corrected rate. Said correction value is determined by the following known formulae:

For a resonator of the spring balance type, the moment of inertia/of the balance corresponds to the formula:

$$I = mr^2 \qquad (1)$$

wherein m represents the mass of the balance 10 and r the radius of gyration thereof that also depends on the temperature by means of the coefficient of expansion of the balance 10.

In addition, the elastic torque C of the balance-spring with constant cross-section corresponds to the formula:

$$C = \frac{Ehe^3}{12L} \qquad (2)$$

wherein E is the modulus of elasticity of the material used, h the height thereof, e the thickness thereof and L the developed length thereof.

Lastly, the frequency f of the resonator 120 including the spring balance corresponds to the formula:

$$f = \frac{1}{2\pi}\sqrt{\frac{C}{I}} \qquad (3)$$

Subsequently, said method includes a step for applying 23 the material in one or more recesses of the balance 10 in order to modify the inertia of the balance 10 according to the correction value. The recess or recesses 15 may be located either only on the felloe 11 or at least one arm 13, or on the felloe 11 and on one or more arms 13 of the balance 10 or in the contour of the felloe 11 defined in the adjustment face. Such a step 23 includes a sub-step for projecting 24 the material into one or more recesses of the balance 10. Said sub-step 24 makes it possible to avoid any mechanical contact with the balance 10 within the context of the adjustment of the rate.

It will be noted that said projection sub-step 24 may be preceded by a sub-step for removing the balance 10 of the horological movement 100, for example, when said balance 10 includes one or more recesses 15 corresponding to the through hole. In this context, the projection of material into said through hole is then produced outside of the movement 110 with the use of:
a support applied, for example, on a face of the balance 10 comprising the back of said recess 15 provided with the orifice and/or
a projected material having a high viscosity index.

Given that the adjustment of the rate according to said method only makes it possible to increase the inertia of the balance 10, the balance 10 is manufactured so as to have a mass deficit in order that the horological movement 110 has a rate advance that will be corrected during said sub-step for projecting 24 material into all of the recesses 15 of said balance 10 or into some of same.

According to one embodiment, the correction value may correspond to a projection of the material into a plurality of recesses 15 of the balance 10 so as to obtain a symmetrical distribution of the projected material in order to modify the inertia of the balance 10 without modifying the centre of mass thereof. In this case, the recesses of the balance 10 are distributed symmetrically notably on the felloe 11 of the balance 10 and the quantity of projected material is identical for each recess 15 in order not to create an unbalance.

According to one embodiment, the correction value is determined by comparing, on one hand, the rate measured and, on the other hand, the unbalance and the frequency desired for the resonator 120. In this case, the correction value corresponds to the asymmetrical distribution of the addition of material by projection into the recesses 15 of the balance 10 distributed symmetrically on the felloe 11 of the balance 10. Alternatively, the recesses 15 of the balance 10 are distributed symmetrically on the felloe 11 of the balance 10 and the material is projected only into some of said recesses 15 that have an asymmetrical configuration in relation to one another. In such a context, the projection sub-step 24 includes a phase for selective projection of the material into one or more of said recesses 15.

In addition, it will be noted that during the projection sub-step 24 one or more types of material are projected on the balance 10. Thus, the recesses 15 of a same balance 10 may:
include the same projected material, or
each include a projected material different from same of all of the other recesses of said balance 10 or from at least one of the other recesses 15 of said balance 10.

Although the projection sub-step 24 may advantageously be produced using an Aerosol Jet printer, any other maskless printing or projection technology is also possible. As we have already mentioned, the material deposited in all of the recesses 15 or in some of same may comprise a glue, a paint or a metal suspension.

Preferentially, the material projection sub-step 24 may be followed by a sub-step for solidifying 25 the projected material and this, notably, if the material is in the liquid or paste-like state. Said sub-step 25 may, depending on the material used, involve evaporating a solvent, thermosetting the material or cross-linking the material in the recess. A polymer may also be deposited in the recess 15 or each recess 15 of the balance 10 then cross-linked by means of an ultra-violet radiation.

The invention claimed is:

1. A balance of a timepiece comprising:
an adjustment face provided with at least one recess provided for receiving a projected material for an implementation of an adjustment of a rate of said timepiece by modification of the inertia and of the unbalance of the balance, said recess including an opening in the adjustment face and a back that is recessed with respect to the opening, said back being a solid back, said back being wider than said opening such that said back is at most partially visible from a position defined above said opening on a central axis of the opening.

2. The balance according to claim 1, wherein the opening includes an edge defining a surface that is smaller than or substantially smaller than a surface of the back of the recess.

3. The balance according to claim 1, wherein the recess extends in a direction forming with the central axis of the opening an acute angle.

4. The balance according to claim 1, wherein the recess has a vertical cross-section of essentially rectangular, square, circular, or even trapezoidal shape.

5. The balance according to claim 1, wherein the recess includes an inner wall provided with a bulge extending substantially horizontally or fully or partially horizontally over a portion of a surface of said wall.

6. The balance according to claim 1, comprising a felloe, a hub intended to be mounted pivoting on a staff balance, and at least one arm connecting the felloe to the hub, the felloe of the balance comprising at least one recess.

7. The balance according to claim 1, comprising a plurality of arms at least one of which includes said at least one recess.

8. The balance according to claim 6, wherein said at least one recess includes a plurality of recesses that are distributed regularly or irregularly on a periphery of the felloe.

9. The balance according to claim 6, wherein said at least one recess includes at least three recesses that are regularly distributed on a periphery of the felloe, each recess extending in an arc of circle of an angle varying between 40° and 60°.

10. A method for adjusting the rate of a timepiece comprising the balance according to claim 1, the method comprising the following steps:
measurement of the rate of the timepiece;
determination of a correction value to be applied to the inertia and/or to the unbalance of the balance in order to obtain a corrected rate of said timepiece, and
application of a material in said at least one recesses arranged on the balance in order to modify the inertia of the balance according to said correction value.

11. The method according to claim 10, wherein the application step includes a projection of the material into one or more of said recesses.

12. The method according to claim 11, wherein the projection includes a phase for selective projection of the material into one or more of said recesses.

13. The method according to claim 11, wherein during the projection one or more types of material are projected on the balance.

14. The method according to claim 10, wherein the method comprises a step for arranging a horological movement including the balance in a middle part of a case of the timepiece.

15. A timepiece comprising the balance according to claim 1.

* * * * *